US012615076B2

(12) United States Patent
Alizadeh et al.

(10) Patent No.: US 12,615,076 B2
(45) Date of Patent: Apr. 28, 2026

(54) NULL-STEERING USING INTERFERENCE ALIGNMENT FOR MULTI-ACCESS POINT (AP) COORDINATION USING CHANNEL STATE INFORMATION

(71) Applicant: Cisco Technology, Inc., San Jose, CA (US)

(72) Inventors: Ardalan Alizadeh, Milpitas, CA (US); Navid Reyhanian, Fremont, CA (US); Sivadeep R. Kalavakuru, Akron, OH (US); Matthew A. Silverman, Shaker Heights, OH (US); Peiman Amini, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 18/459,564

(22) Filed: Sep. 1, 2023

(65) Prior Publication Data

US 2024/0380459 A1     Nov. 14, 2024

Related U.S. Application Data

(60) Provisional application No. 63/501,768, filed on May 12, 2023.

(51) Int. Cl.
H04B 7/00 (2006.01)
H04B 7/0456 (2017.01)
H04B 7/06 (2006.01)

(52) U.S. Cl.
CPC ......... H04B 7/0626 (2013.01); H04B 7/0479 (2023.05)

(58) Field of Classification Search
CPC ..... H04B 7/0626; H04B 7/0479; H04B 7/024
See application file for complete search history.

(56) References Cited

U.S. PATENT DOCUMENTS 9,258,099 B2 * 2/2016 Aboul-Magd ........ H04L 5/0073
10,142,082 B1 * 11/2018 Shattil ............... H04L 27/26134
(Continued)

FOREIGN PATENT DOCUMENTS

WO         2022199799 A1     9/2022

OTHER PUBLICATIONS

International Search Report and Written Opinion for International Application No. PCT/US2024/028667, mailed Sep. 24, 2024, 14 Pages.

*Primary Examiner* — Pakee Fang
(74) *Attorney, Agent, or Firm* — Merchant & Gould P.C.

(57) ABSTRACT

Enhancing Multi-Access Point (AP) Coordination (MAPC) null-steering may be provided. Enhancing null-steering may include sending a coordination request for MAPC. A coordination response may be received from one or more APs. A Channel State Information (CSI) request may then be sent. CSI of one or more clients associated with the one or more APs may be received. Next, one or more precoder and decoder matrices may be determined based on the CSI of the one or more clients. The one or more precoder matrices may be sent to the one or more APs, and the one or more decoder matrices may be sent to the one or more clients. A transmission may be sent to a first client using null-steering and interference alignment based on the one or more precoder matrices, wherein the transmitting is synchronized with transmissions by the one or more APs to the one or more clients.

14 Claims, 7 Drawing Sheets

400 ⟍

(56)  References Cited

U.S. PATENT DOCUMENTS

| | | | |
|---|---|---|---|
| 11,405,084 B1 | 8/2022 | Changlani et al. | |
| 2014/0119300 A1 | 5/2014 | Aboul-Magd et al. | |
| 2014/0241240 A1 | 8/2014 | Kloper et al. | |
| 2015/0036623 A1* | 2/2015 | Maaref | H04L 25/03891 |
| | | | 370/329 |
| 2016/0088637 A1 | 3/2016 | Suh et al. | |
| 2019/0058514 A1 | 2/2019 | Zhang | |
| 2021/0385779 A1* | 12/2021 | Oteri | H04B 7/024 |
| 2023/0102611 A1* | 3/2023 | Suh | H04B 7/0456 |
| | | | 370/328 |
| 2024/0014866 A1* | 1/2024 | Alizadeh | H04J 11/003 |

* cited by examiner

300

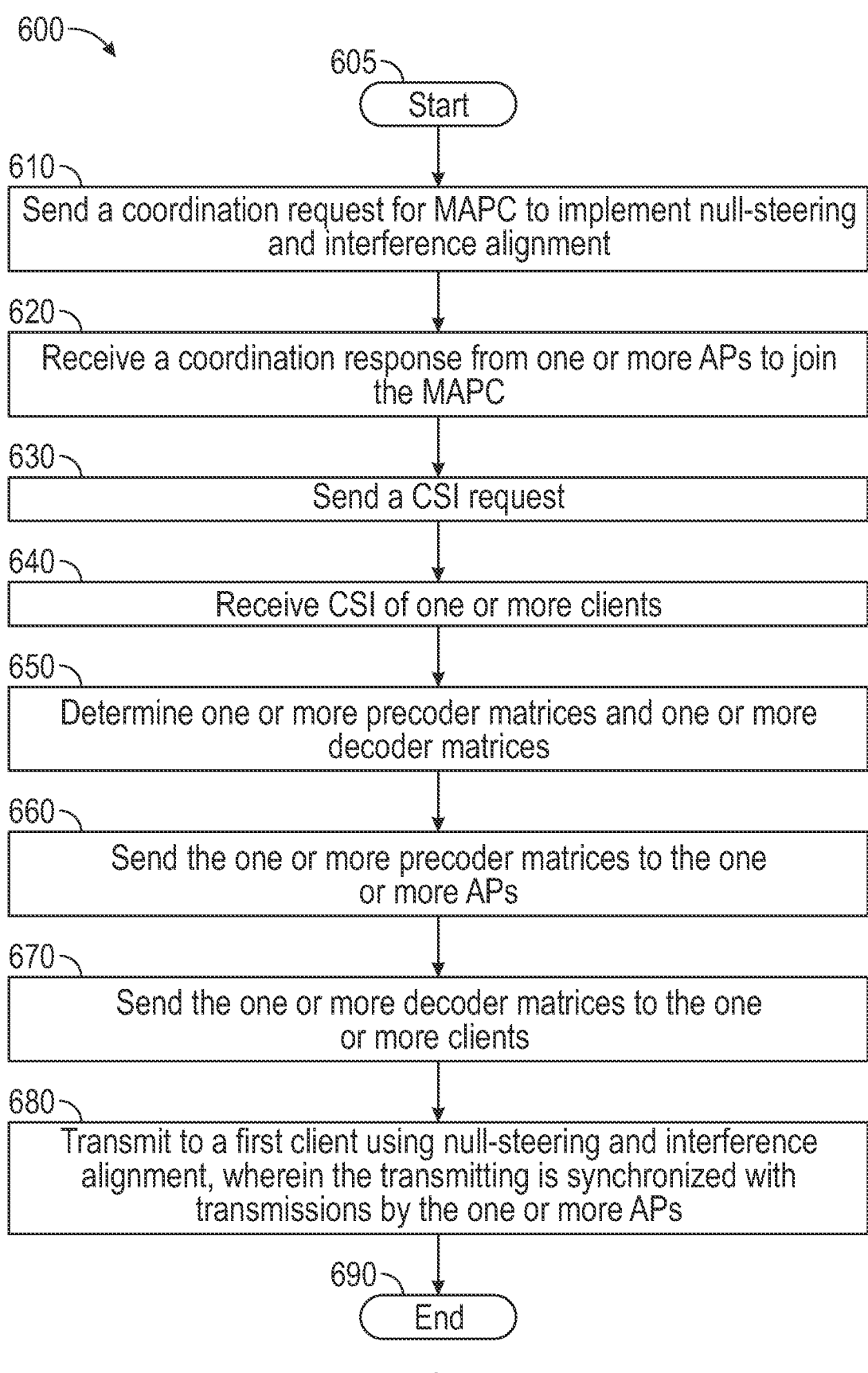

600

605
Start

610
Send a coordination request for MAPC to implement null-steering and interference alignment 620
Receive a coordination response from one or more APs to join the MAPC 630
Send a CSI request 640
Receive CSI of one or more clients 650
Determine one or more precoder matrices and one or more decoder matrices 660
Send the one or more precoder matrices to the one or more APs 670
Send the one or more decoder matrices to the one or more clients 680
Transmit to a first client using null-steering and interference alignment, wherein the transmitting is synchronized with transmissions by the one or more APs 690
End

FIG. 6

NULL-STEERING USING INTERFERENCE ALIGNMENT FOR MULTI-ACCESS POINT (AP) COORDINATION USING CHANNEL STATE INFORMATION

RELATED APPLICATION

Under provisions of 35 U.S.C. § 119(e), Applicant claims the benefit of U.S. Provisional Application No. 63/501,768 filed May 12, 2023, which is incorporated herein by reference.

TECHNICAL FIELD

The present disclosure relates generally to enhancing Multi-Access Point (AP) Coordination (MAPC) null-steering.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 6 is a flow chart of a method for enhancing MAPC null-steering; and

DETAILED DESCRIPTION

Overview

Figure 1:
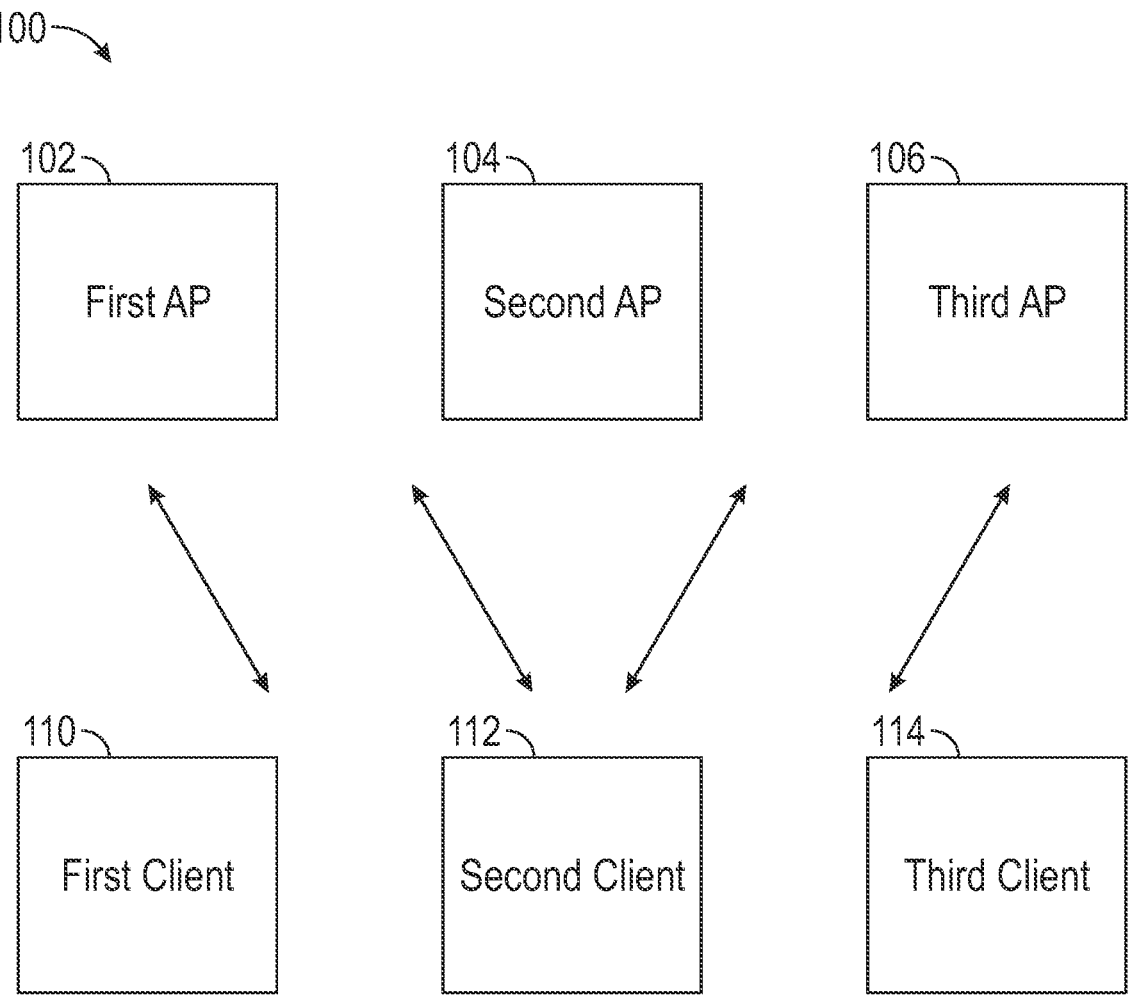
FIG. 1 is a block diagram of an operating environment for enhancing Multi-Access Point (AP) Coordination (MAPC) null-steering.

Enhancing Multi-Access Point (AP) Coordination (MAPC) null-steering may be provided. Enhancing null-steering may include sending a coordination request for MAPC to implement null-steering and interference alignment. A coordination response may be received from one or more APs to join the MAPC. A Channel State Information (CSI) request may then be sent. CSI of one or more clients associated with the one or more APs may be received. Next, one or more precoder matrices and one or more decoder matrices may be determined based on the CSI of the one or more clients. The one or more precoder matrices may be sent to the one or more APs, and the one or more decoder matrices may be sent to the one or more clients. A transmission may be sent to a first client using null-steering and interference alignment based on the one or more precoder matrices, wherein the transmitting is synchronized with transmissions by the one or more APs to the one or more clients.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Among Multi-Access Point (AP) Coordination (MAPC) methods, null-steering techniques may be used to provide concurrent usage of the entire channel without requiring all APs to have the same data for transmission. Null-steering may also avoid mutual interference between associated clients of neighbor cells while maximizing the Signal to Noise Ratio (SNR) of the desired/associated clients per Basic Service Set (BSS).

Using null-steering may lead to challenges in some cases. One challenge of null-steering may be the reduced number of degrees of freedom available for transmission, limited by the number of antennas a transmitter has, because null-steering may require the transmitter (e.g., an AP) to cancel the signal in a specific direction. The reduced degrees of freedom may limit the transmission rates and may lead to reduced system performance which can be critical design criteria in developing networks for enterprise networking scenarios, especially, in dense environments. Null-steering may also not be capable of completely removing interference. Therefore, when the power of a desired signal and the interference produced when null-steering are in the same range (e.g., in low Signal to Interference (SIR) regimes), using null-steering may not significantly improve network performance.

Interference alignment techniques may be used to utilize the available degrees of freedom more efficiently and therefore achieve higher data rates. Interference alignment techniques can mitigate multi-user interference by aligning the interference from different users (e.g., APs, clients) in a way that they do not interfere with each other. Interference alignment may include APs using multiple signaling dimension to align mutual interference at receivers. Precoding and decoding matrices may be determined so APs can precode communications to enhance transmission power and receiver devices can decode signals. Thus, enhanced null-steering is described herein utilizing interference alignment.

FIG. 1 is a block diagram of an operating environment 100 for enhancing Multi-Access Point (AP) Coordination (MAPC) null-steering. The operating environment 100 may include a first AP 102, a second AP 104, a third AP 106, a first client 110, a second client 112, and a third client 114. The first AP 102, the second AP, and/or the third AP 106 may communicate with the first client 110, the second client 112, and/or the third client 114 to enable the first client 110, the second client 112, and/or the third client 114 to access the network. The first AP 102, the second AP, and/or the third AP 106 may communicate with the first client 110, the second client 112, and/or the third client 114 using null-steering and interference alignment to improve network performance.

A K-User interference channel, as described by the Institute of Electrical and Electronics Engineers (IEEE) 802.11 standard, is a type of network in which K pairs of transmitters and receivers (e.g., pairs of APs and/or clients) exchange K independent messages between each other. When transmitting information to the clients through K non-overlapped frequency channels, each user may achieve 1/K of the total capacity on average (i.e., ergodic capacity) when the entire band is being used (e.g., capacity=1/K*log (SNR))). However, when interference alignment is utilized (i.e., all transmissions are in the same band but with certain precoder/decoders), each AP-client pair may achieve half of the total capacity (i.e., capacity=½*log(SNR)). Thus, using interference alignment may allow the maximum or nearly maximum achievable sum rate of K-User interface channel networks. The first AP 102, the second AP 104, and the third AP 106 may operate a K-user interference channel utilizing interference alignment to enhance null-steering.

The first AP 102, the second AP 104, and the third AP 106 can implement null-steering with interference alignment with less precise Channel State Information (CSI), because accurate null-steering without using interference alignment is sensitive to accurate CSI estimation. Thus, interference alignment allows for more accurate null-steering when sounding with the first client 110, the second client 112, and the third client 114 does not result in completely accurate and/or up to date CSI (e.g., a client, such as a mobile smartphone, may change position since sounding was performed). The first AP 102, the second AP 104, and the third AP 106 can adapt to the changing interference patterns and maintain system performance while client characteristics change using interference alignment. Additionally, interference alignment may enable APs to use the available degrees of freedom more efficiently than with null-steering alone to achieve higher data rates. Finally, null-steering in coordinated beamforming is designed to cancel the interference from a specific direction. However, in multi-user scenarios, interference may come from multiple directions, and using null-steering may not completely eliminate interference based on the relative positions of the clients. Interference alignment techniques can mitigate multi-client interference more effectively by aligning the interference from different clients in a way that the interference does not interfere with the client communications.

For multi-client scenarios, the first AP 102, the second AP 104, and the third AP 106 may utilize shared and/or private subspaces for interference alignment. Shared subspaces may be common to all clients and can be used to transmit a common signal that all clients need, and private subspaces may be dedicated to a client and can be used to transmit individual signals that are intended for the associated client (similar to multiple spatial streams).

A primary subspace may be a shared subspace that spans the signal space of all clients and contains a common signal, and the orthogonal complement of the primary subspace may form a shared subspace. The primary subspace may also be referred to as the interference subspace because the primary subspace may capture the interference that each client experiences from other clients. The shared subspace may capture the interference that all clients experience together. After determining the transmit and receive precoder and decoder matrices, the first AP 102, the second AP 104, and the third AP 106 can use interference alignment to align the interference in the shared subspace while allowing each client to recover its own signal in the associated private subspace, resulting improved network capacity and performance.

For example, the first AP 102, the second AP 104, and the third AP 106 may each have eight antennas and two associated clients with two antennas. The first AP 102, the second AP 104, and the third AP 106 can divide the eight antennas into four antennas for the shared subspace and four antennas for the private subspace. Then, the first AP 102, the second AP 104, and the third AP 106 can assign one antenna for the common signal and one antenna for each client's private signal in each subspace. For the shared subspace, the first AP 102, the second AP 104, and the third AP 106 can allocate one antenna for the common signal that all clients need and one antenna for each client's interference signal. Therefore, the shared subspace of each AP will have three signals: one common signal and two interference signals. For the private subspace, the first AP 102, the second AP 104, and the third AP 106 can allocate one antenna for each client's individual signal and one antenna for each client's interference signal from other clients in the same AP. Therefore, the private subspace of each AP will have four signals: two individual signals and two interference signals. By determining the transmit and receive filters (e.g., the precoder matrices and decoder matrices) of the APs and the clients, the first AP 102, the second AP 104, and the third AP 106 can use interference alignment to align the interference between different clients in the shared subspace while allowing each client to recover its own signal in its private subspace. Thus, each AP can support two clients simultaneously with minimal interference.

Figure 2:
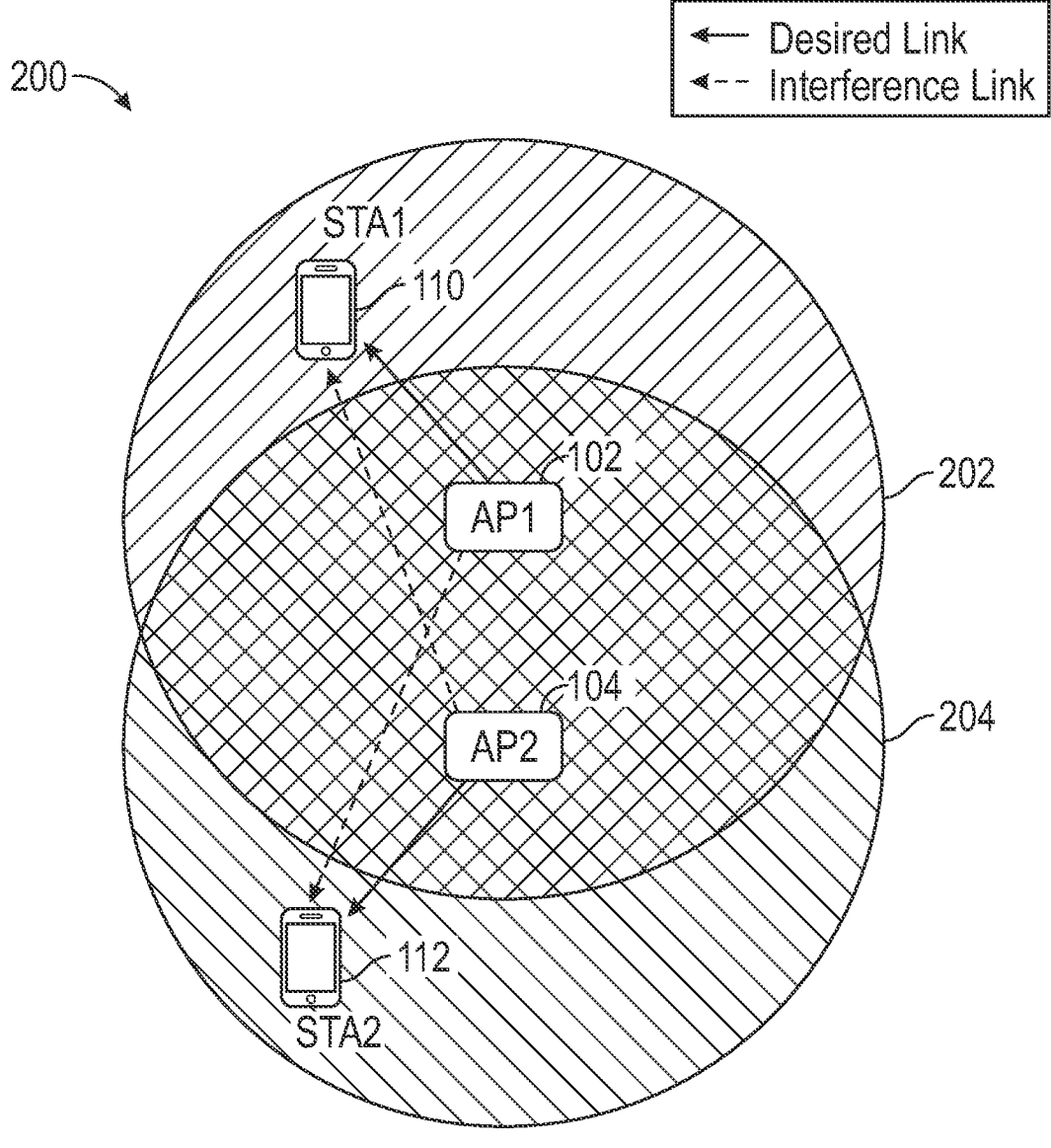
FIG. 2 is a block diagram of a low interference environment.

FIG. 2 is a block diagram of a low interference environment 200. The low interference environment 200 may include the first AP 102, the second AP 104, the first client 110, and the second client 112. The first AP 102 may have a first AP coverage area 202, and the second AP 104 may have a second AP coverage area 204. The first AP coverage area 202 and the second AP coverage area 204 may be the areas the APs are effective at sending transmissions. However, AP transmissions may still be received or interfere with other signals outside of the coverage areas.

The first AP 102 may be transmitting or otherwise communicating with the first client 110, and the second AP 104 may be transmitting or otherwise communicating with the second client 112. Because the first client 110 is inside of the first AP coverage area 202 and is communicating with the first AP 102 and outside of the second AP coverage area 204 and not communicating with the second AP 104, interference from the second AP 104 may be low because the intended signal's power (e.g., the first AP 102 signal power to the first client 110) will be higher than the unintended signal's power (e.g., the second AP 104 signal power the first client 110 receives from second AP 104 transmissions to another client). The second client 112 is inside of the second AP coverage area 204 and is communicating with the second AP 104. Additionally, the second client 112 is outside of the first AP coverage area 202 and is not communicating with the first AP 102, so interference from the first AP 102 may be low. However, the transmissions may still interfere with each other because the first AP 102 and the second AP 104 may be transmitting on the same channel, adjacent channels, or otherwise overlapping channels. The transmissions the first AP 102 and the second AP 104 send may therefore act as noise for the intended client, lowering the SNR of the transmissions the first client 110 and the second client 112 receive.

When the first AP 102 and the second AP 104 perform null-steering, the first AP 102 and the second AP 104 may assign weights to the Transmit (Tx) antennas to create nulls in particular directions to reduce the signal noise (i.e., increase the SNR). Thus, the first AP 102 and the second AP 104 may beamform the signals to send the signals in desired directions (e.g., the first AP 102 beamforming to direct the signal to the first client 110) and prevent sending signals in undesired directions (e.g., the first AP 102 creating a null in the direction of the second client 112). To lower the interference in the low interference environment 200, the first AP 102 may perform null-steering to direct the signal to the first client 110 and null the signal in the direction of the second client 112, and the second AP 104 may perform null-steering to direct the signal to the second client 112 and null the signal in the direction of the first client 110.

Figure 3:
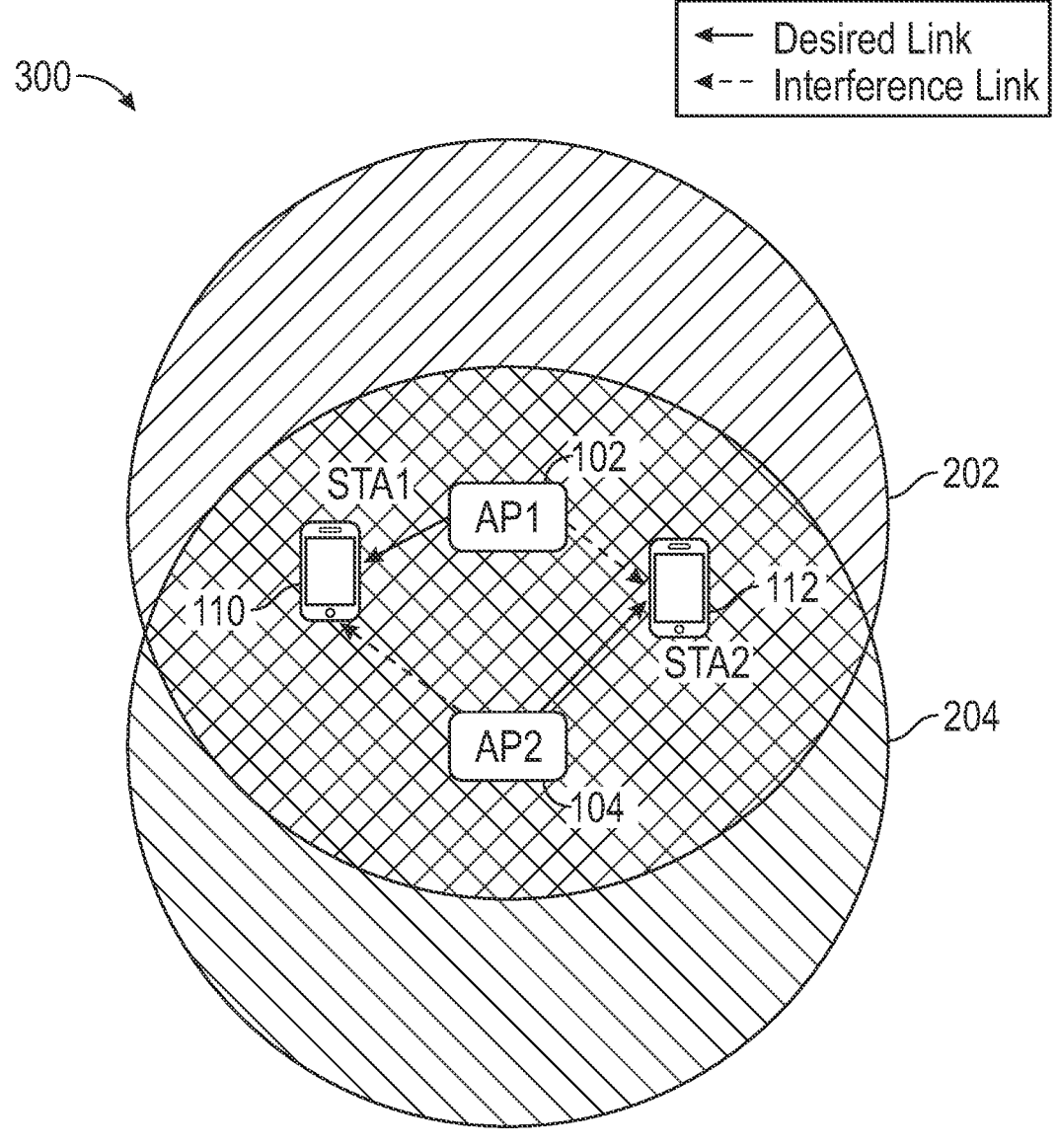
FIG. 3 is a block diagram of a high interference environment.

FIG. 3 is a block diagram of a high interference environment 300. The high interference environment 300 may include the first AP 102, the second AP 104, the first client 110, and the second client 112. The first AP 102 may have the first AP coverage area 202, and the second AP 104 may have the second AP coverage area 204. The first client 110 and the second client 112 are positioned in both the first AP coverage area 202 and the second AP coverage area 204.

The first AP 102 may be transmitting or otherwise communicating with the first client 110, and the second AP 104 may be transmitting or otherwise communicating with the second client 112. Because the first client 110 and the second client 112 are positioned in both the first AP coverage area 202 and the second AP coverage area 204, interference from the APs may be high because the signal strength from the first AP 102 and the second AP 104 may be similar (e.g., a SNR close to a value of one).

Null-steering may not work as effectively in dense environments where the interference power is in the range of the desired signal power like the illustrated high interference environment 300. Thus, the first AP 102 and the second AP 104 may perform interference alignment to enhance the effects of null-steering in the high interference environment 300. Additionally, the first AP 102 and the second AP 104 may perform interference alignment to enhance the effects of null-steering in the low interference environment 200 to increase the effectiveness of the null-steering and further increase the SNR of the signals the first client 110 and the second client 112 receive.

Figure 4:
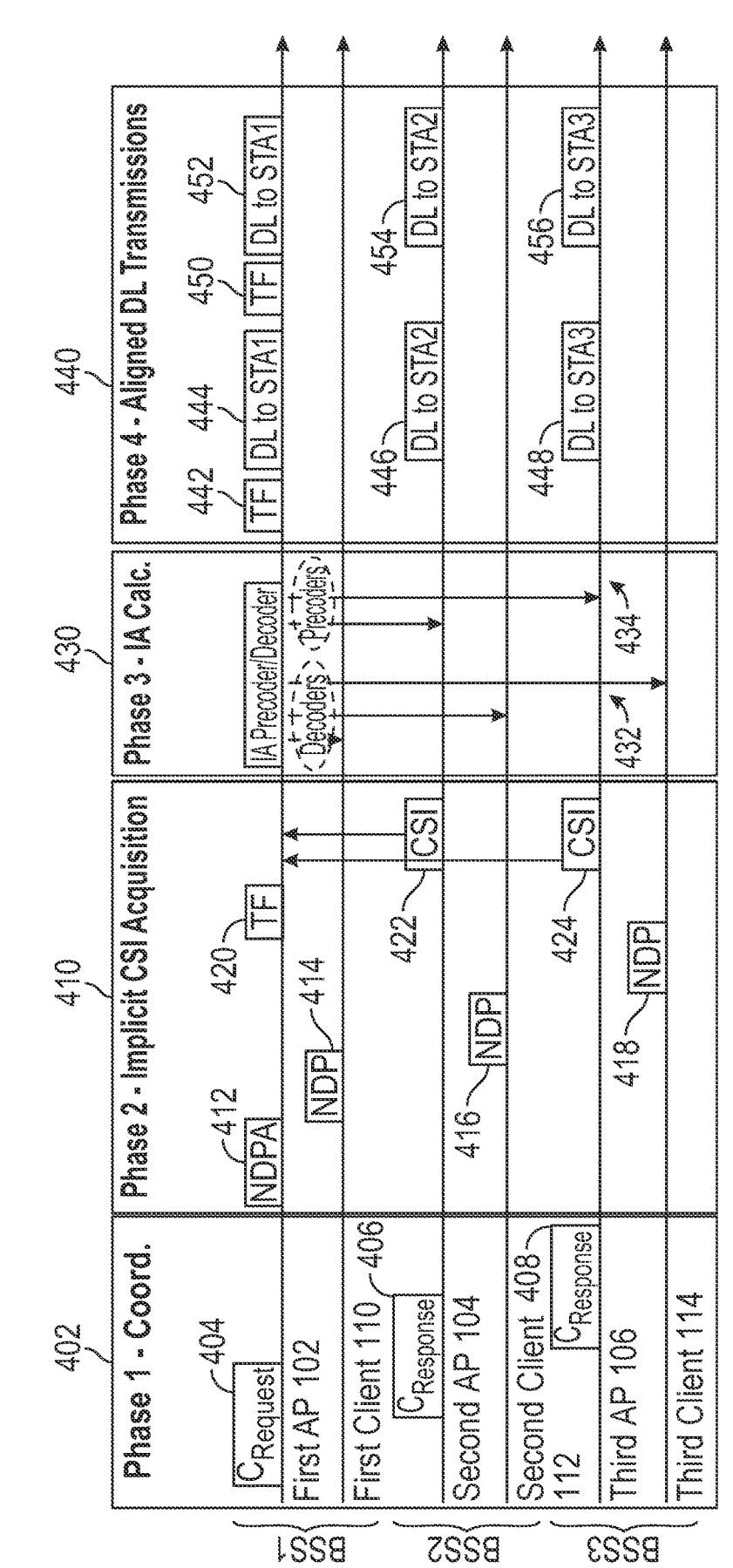
FIG. 4 is a flow chart of a signal process for enhancing MAPC null-steering.

FIG. 4 is a flow chart of a signal process 400 for enhancing MAPC null-steering. The signal process 400 includes the first AP 102, the second AP 104, the third AP

106, the first client 110, the second client 112, and the third client 114. The first AP 102, the second AP 104, and the third AP 106 may utilize interference alignment for enhancing null-steering in the signal process 400. In this example, the first AP 102 may intend to communicate with the first client 110, the second AP 104 may intend to communicate with the second client 112, and the third AP 106 may intend to communicate with the third client 114. Thus, the first AP 102, the second AP 104, and the third AP 106 may perform the signal process 400 to coordinate to communicate with the respective intended client. However, other AP-client pairs may be intended in other examples (e.g., multiple clients for APs, common clients for multiple APs, etc.).

One of the APs may be act as a coordinating or primary AP. In the illustrated example, the first AP 102 acts as the primary AP. In the coordination phase 402, the first AP 102 may request AP coordination by transmitting a coordination request 404. The coordination request 404 may be transmitted to be received by any AP, and any AP that receives the request may join in the signal process 400 to coordinate with the first AP 102. In the signal process 400, the second AP 104 and the third AP 106 may receive the coordination request 404 and join the coordination. The second AP 104 may join the coordination by transmitting a second AP coordination response 406 to the first AP 102, and the third AP 106 may join the coordination by transmitting a third AP coordination response 408 to the first AP 102. The second AP 104 and the third AP 106 may also transmit to the first AP 102 a list of clients the APs are linked to or otherwise communicating with. The first AP 102 may use the lists of clients to determine which clients to send transmissions to during the signal process 400. For example, the second AP 104 may inform the first AP 102 that the second AP 104 is communicating with the second client 112, and the third AP 106 may inform the first AP 102 that the third AP 106 is communicating with the third client 114. Thus, the first AP 102 may communicate with the first client 110, communicating with the first AP 102, the second client 112, and the third client 114 during the signal process 400.

After the coordination phase 402, the signal process 400 may proceed to the CSI acquisition phase 410, and the first AP 102 may initiate channel sounding to receive the CSI. The first AP 102 may transmit a CSI request 412 to the first client 110, the second client 112, and the third client 114 to initiate the channel sounding. The CSI request 412 may be a Null Data Packet (NDP) Announcement (NDPA) frame in some examples. In response to the CSI request 412, the first client 110 may transmit first client feedback 414, the second client 112 may transmit second client feedback 416, and the third client 114 may transmit third client feedback 418. In some examples, the first client feedback 414, the second client feedback 416, and the third client feedback 418 may be NDP frames. The first AP 102 may estimate the first client CSI based on the first client feedback 414, the second AP 104 may estimate the second client CSI 422 based on the second client feedback 416, and the third AP 106 may estimate the third client CSI 424 based on the third client feedback 418. The first AP 102 may then send a trigger frame 420 to request the CSI from the second AP 104 and the third AP 106. The second AP 104 may transmit to the first AP 102 the second client CSI 422, and the third AP 106 may transmit the third client CSI 424 to the first AP 102 in response to the trigger frame 420. In other examples, the first AP 102 may receive the first client feedback 414, the second client feedback 416, and the third client feedback 418, and estimate the CSI for all clients.

In some examples, the first AP 102, the second AP 104, and the third AP 106 may perform null-steering with interference alignment without collecting CSI from the clients. The first AP 102, the second AP 104, and the third AP 106 may use statistical information of the first AP 102, the second AP 104, and the third AP 106 to estimate the positions of clients the first AP 102, the second AP 104, and the third AP 106 are communicating with and determine how to perform the interference alignment. This blind interference alignment method may have nearly the same or the same performance as performing interference alignment using CSI.

After the CSI acquisition phase 410, the signal process 400 may proceed to the interference alignment phase 430. In the interference alignment phase 430, the first AP 102 may calculate precoder matrices 432 and decoder matrices 434 based on alignment criteria. The first AP 102 may determine alignment criteria based on the CSI of the first client 110, the second client 112, and the third client 114. Once the first AP 102 determines the precoder matrices 432 and the decoder matrices 434, the first AP 102 may transmit precoder matrices 432 to the second AP 104 and the third AP 106 and decoder matrices 434 to the first client 110, the second client 112, and the third client 114.

In some embodiments, the interference alignment phase 430 may be optional for certain clients. For example, if the clients are positioned as shown in the low interference environment 200, interference may not be necessary because the clients may not experience a high enough level of interference to have issues communicating with APs. The first AP 102 may determine clients for implementing interference alignment with a low SIR (or low SNR) at the beginning of the interference alignment phase 430. Determining the SIR may be based on the Received Signal Strength Indicator (RSSI) of signals the clients send. Thus, the first AP 102 may select clients to be included in the interference alignment phase 430 (e.g., clients in the high interference environment 300) and exclude clients that are positioned so interference alignment is not necessary for communications.

After the interference alignment phase 430, the signal process 400 may proceed to the downlink transmissions phase 440. In the downlink transmissions phase 440, the first AP 102 may transmit a second trigger frame 442 so the first AP 102, the second AP 104, and the third AP 106 can transmit aligned transmissions. In an example, the precoder matrices 432 and the decoder matrices 434 may be transmitted via the second trigger frame 442. After the second trigger frame 442, the first AP 102 may transmit a first client downlink transmission 444 to the first client 110, the second AP 104 may transmit a second client downlink transmission 446 to the second client 112, and the third AP 106 may transmit a third client downlink transmission 448 to the third client 114. If additional transmissions are necessary or otherwise desired, the first AP 102 may send a third trigger frame 450 for alignment of the subsequent transmissions. After the third trigger frame 450, the first AP 102 may transmit another first client downlink transmission 452 to the first client 110, the second AP 104 may transmit another second client downlink transmission 454 to the second client 112, and the third AP 106 may transmit another third client downlink transmission 456 to the third client 114. The first AP 102 can continue sending trigger frames for addition synchronized transmissions as desired. The first AP 102, the second AP 104, and the third AP 106 may use the precoder matrices to perform null-steering with interference alignment to send the transmissions.

Figure 5:
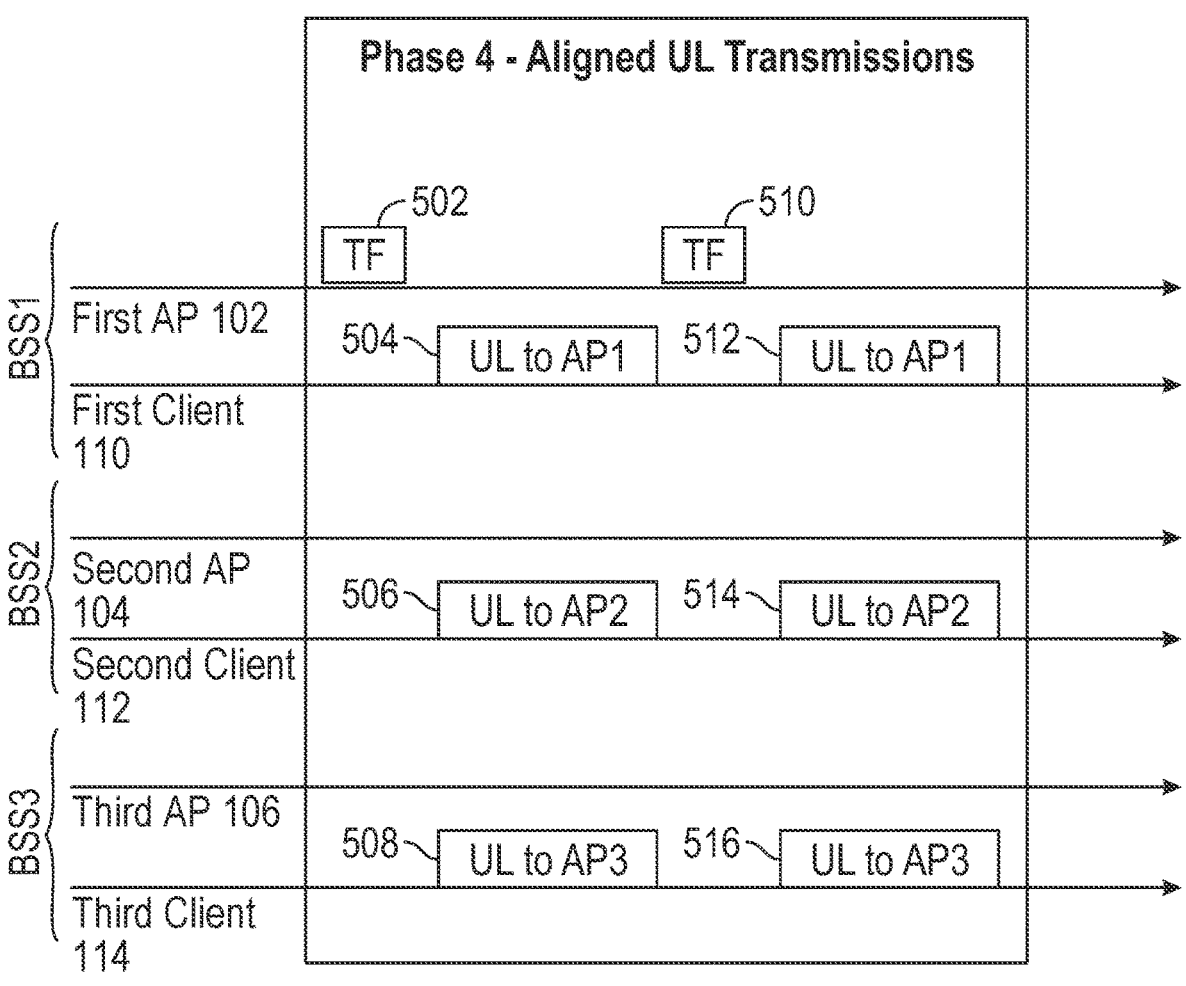
FIG. 5 is a flow chart of an uplink transmission signal process for enhancing MAPC null-steering.

FIG. 5 is a flow chart of an uplink transmission signal process 500 for enhancing MAPC null-steering. Because of the reciprocity of the channels, the same method of enhancing null-steering using interference alignment can be used for uplink transmissions. Thus, the clients can use null-steering and interference alignment to communicate with APs. For example, can concurrently transmit Acknowledge (ACK) transmissions.

The uplink transmission signal process 500 may proceed after the signal process 400 after the interference alignment phase 430. The first AP 102 may send a fourth trigger frame 502 for alignment of the client transmissions. After the fourth trigger frame 502, the first client 110 may send a first AP uplink transmission 504 to the first AP 102, the second client 112 may send a second AP uplink transmission 506 to the second AP 104, and the third client 114 may send a third AP uplink transmission 508 to the third AP 106. If another uplink transmission period is necessary, the first AP 102 may send a fifth trigger frame 510 to synchronize the next transmissions. The first client 110 may then send another first AP uplink transmission 512 to the first AP 102, the second client 112 may send another second AP uplink transmission 514 to the second AP 104, and the third client 114 may send another third AP uplink transmission 516 to the third AP 106 The first AP 102 may continue sending trigger frames for additional synchronized transmissions as desired. The first client 110, the second client 112, and the third client 114 may use the decoder matrices for transmitting using null-steering and interference alignment.

FIG. 6 is a flow chart of a method 600 for enhancing MAPC null-steering. The method 600 may begin at starting block 605 and proceed to operation 610. In operation 610, a coordination request may be sent for MAPC to implement null-steering and interference alignment. For example, the first AP 102, acting as the primary AP, may broadcast a coordination request for other APs to receive (e.g., the coordination request 404).

In operation 620, a coordination response may be received from one or more APs to join the MAPC. For example, the first AP 102 may receive coordination responses from the second AP 104 (e.g., the second AP coordination response 406) and the third AP 106 (e.g., the third AP coordination response 408). The second AP 104 and the third AP 106 may also send a list of clients.

In operation 630, a CSI request may be sent. For example, the first AP 102 may send the CSI request 412. In response to the CSI request, the first AP 102 may receive the first client feedback 414 and determine first client CSI based on the first client feedback 414, the second AP 104 may receive the second client feedback 416 and determine second client CSI based on the second client feedback 416, and the third AP 106 may receive the third client feedback 418 and determine third client CSI based on the third client feedback 418. In operation 640, CSI of one or more clients associated with the one or more APs may be received. For example, the first AP 102 may receive the second client CSI from the second AP 104 and the third client CSI from the third AP 106. Alternatively, the first AP 102 may receive the first client feedback 414, the second client feedback 416, and the third client feedback 418 and determine the first client CSI, the second client CSI, and the third client CSI using the feedback.

In operation 650, one or more precoder matrices and one or more decoder matrices may be determined based on the CSI of the one or more clients. For example, the first AP 102 may determine the precoder matrices and decoder matrices based on the first client CSI, the second client CSI, and the third client CSI. In operation 660, the one or more precoder matrices may be sent to the one or more APs. For example, the first AP 102 sends the precoder matrices to the second AP 104 and the third AP 106. In operation 670, the one or more decoder matrices may be sent to the one or more clients. For example, the first AP 102 may send the decoder matrices to the first client 110, the second client 112, and the third client 114.

In operation 680, a first client may be transmitted to using null-steering and interference alignment based on the one or more precoder matrices. For example, the first AP 102 may transmit to the first client 110, wherein the transmitting is synchronized with a transmission by the second AP 104 to the second client 112 using null-steering and interference alignment and a transmission by the third AP 106 to the third client 114 using null-steering and interference alignment. The method 600 may conclude at ending block 690.

Figure 7:
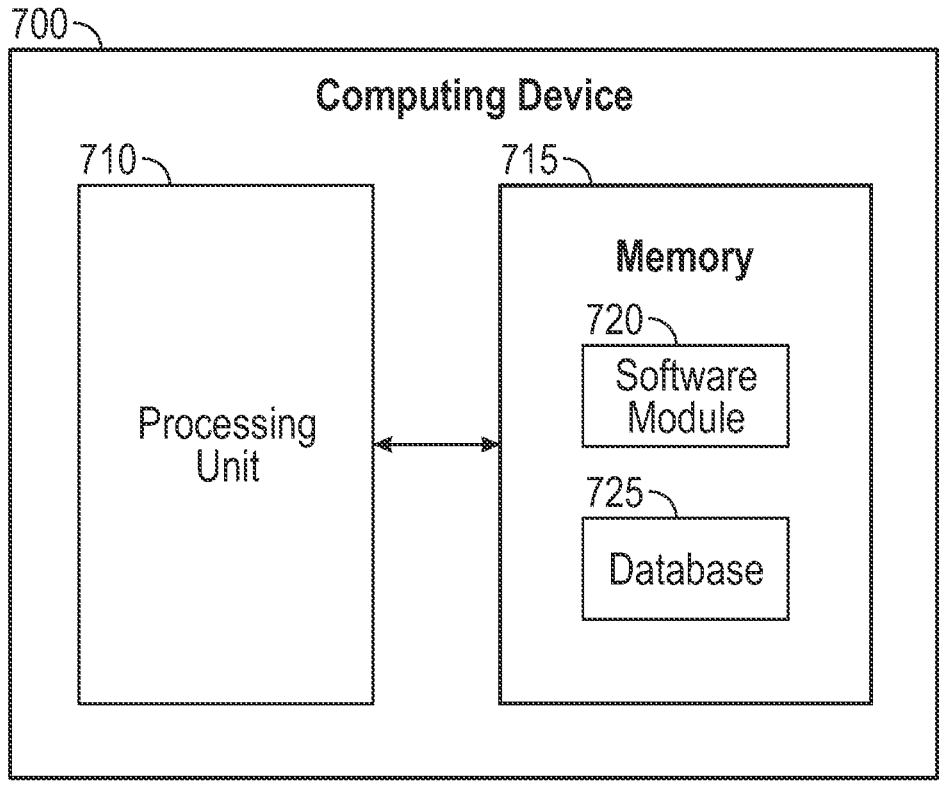
FIG. 7 is a block diagram of a computing device.

FIG. 7 is a block diagram of a computing device 700. As shown in FIG. 7, computing device 700 may include a processing unit 710 and a memory unit 715. Memory unit 715 may include a software module 720 and a database 725. While executing on processing unit 710, software module 720 may perform, for example, processes for enhancing MAPC null-steering using interference alignment with respect to FIG. 1, FIG. 2, FIG. 3, FIG. 4, FIG. 5, and FIG. 6. Computing device 700, for example, may provide an operating environment for the first AP 102, the second AP 104, the third AP 106, the first client 110, the second client 112, the third client 114, and the like. The first AP 102, the second AP 104, the third AP 106, the first client 110, the second client 112, the third client 114, and the like may operate in other environments and are not limited to computing device 700.

Computing device 700 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples, and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
sending a coordination request for Multi-Access Point (AP) Coordination (MAPC) to implement null-steering and interference alignment;
receiving a coordination response from one or more APs to join the MAPC;
sending a Channel State Information (CSI) request;
receiving CSI of one or more clients associated with the one or more APs;
determining one or more precoder matrices and one or more decoder matrices based on the CSI of the one or more clients;
sending the one or more precoder matrices to the one or more APs;
sending the one or more decoder matrices to the one or more clients; and
transmitting to a first client using null-steering and interference alignment based on the one or more precoder matrices, wherein the transmitting is synchronized with transmissions by the one or more APs to the one or more clients;
receiving a list of clients from the one or more APs, wherein:
the list of clients includes the one or more clients, and
the CSI request comprises a request for the CSI of the one or more clients;
determining a group of low interference positioned clients, wherein the list of clients includes the group of low interference positioned clients and the one or more clients are high interference positioned clients; and
selecting the high interference positioned clients for communicating with null-steering and interference alignment, wherein determining the one or more precoder matrices and the one or more decoder matrices is based on CSI of the high interference positioned clients.

2. The method of claim 1, further comprising:
receiving feedback from the first client in response to the CSI request; and
estimating CSI of the first client based on the feedback, wherein determining the one or more precoder matrices and the one or more decoder matrices is further based on the CSI of the first client.

3. The method of claim 1, further comprising:
receiving, from the first client, an uplink transmission from the first client using null-steering and interference alignment, wherein the uplink transmission is synchronized with additional uplink transmissions from the one or more clients.

4. The method of claim 1, further comprising:
determining a shared subspace for common transmissions to the first client and the one or more clients;
determining a primary subspace containing the common transmissions; and
determining private subspaces for the first client and the one or more clients for individual transmissions.

5. The method of claim 1, further comprising:
sending a trigger frame for synchronizing the transmitting to the first client and the transmissions by the one or more APs.

6. A system comprising:
a memory storage; and
a processing unit coupled to the memory storage, wherein the processing unit is operative to:
send a coordination request for Multi-Access Point (AP) Coordination (MAPC) to implement null-steering and interference alignment;
receive a coordination response from one or more APs to join the MAPC;
send a Channel State Information (CSI) request;
receive CSI of one or more clients associated with the one or more APs;
determine one or more precoder matrices and one or more decoder matrices based on the CSI of the one or more clients;
send the one or more precoder matrices to the one or more APs;
send the one or more decoder matrices to the one or more clients;
transmit to a first client using null-steering and interference alignment based on the one or more precoder matrices, wherein the transmitting is synchronized with transmissions by the one or more APs to the one or more clients;
receive a list of clients from the one or more APs, wherein:
the list of clients includes the one or more clients, and
the CSI request comprises a request for the CSI of the one or more clients;
determine a group of low interference positioned clients, wherein the list of clients includes the group of low interference positioned clients and the one or more clients are high interference positioned clients; and
select the high interference positioned clients for communicating with null-steering and interference alignment, wherein determining the one or more precoder matrices and the one or more decoder matrices is based on CSI of the high interference positioned clients.

7. The system of claim 6, the processing unit being further operative to:
receiving feedback from the first client in response to the CSI request; and
estimating CSI of the first client based on the feedback, wherein determining the one or more precoder matrices and the one or more decoder matrices is further based on the CSI of the first client.

8. The system of claim 6, the processing unit being further operative to:
receive, from the first client, an uplink transmission from the first client using null-steering and interference alignment, wherein the uplink transmission is synchronized with additional uplink transmissions from the one or more clients.

9. The system of claim 6, the processing unit being further operative to:
determine a shared subspace for common transmissions to the first client and the one or more clients;
determine a primary subspace containing the common transmissions; and determine private subspaces for the first client and the one or more clients for individual transmissions.

10. The system of claim 6, the processing unit being further operative to:

send a trigger frame for synchronizing the transmitting to the first client and the transmissions by the one or more APs.

11. A non-transitory computer-readable medium that stores a set of instructions which when executed perform a method executed by the set of instructions comprising:

sending a coordination request for Multi-Access Point (AP) Coordination (MAPC) to implement null-steering and interference alignment;

receiving a coordination response from one or more APs to join the MAPC;

sending a Channel State Information (CSI) request;

receiving CSI of one or more clients associated with the one or more APs;

determining one or more precoder matrices and one or more decoder matrices based on the CSI of the one or more clients;

sending the one or more precoder matrices to the one or more APs;

sending the one or more decoder matrices to the one or more clients; and transmitting to a first client using null-steering and interference alignment based on the one or more precoder matrices, wherein the transmitting is synchronized with transmissions by the one or more APs to the one or more clients;

receiving a list of clients from the one or more APs, wherein:

the list of clients includes the one or more clients, and the CSI request comprises a request for the CSI of the one or more clients;

determining a group of low interference positioned clients, wherein the list of clients includes the group of low interference positioned clients and the one or more clients are high interference positioned clients; and selecting the high interference positioned clients for communicating with null-steering and interference alignment, wherein determining the one or more precoder matrices and the one or more decoder matrices is based on CSI of the high interference positioned clients.

12. The non-transitory computer-readable medium of claim 11, the method executed by the set of instructions further comprising:

receiving feedback from the first client in response to the CSI request; and estimating CSI of the first client based on the feedback, wherein determining the one or more precoder matrices and the one or more decoder matrices is further based on the CSI of the first client.

13. The non-transitory computer-readable medium of claim 11, the method executed by the set of instructions further comprising:

receiving, from the first client, an uplink transmission from the first client using null-steering and interference alignment, wherein the uplink transmission is synchronized with additional uplink transmissions from the one or more clients.

14. The non-transitory computer-readable medium of claim 11, the method executed by the set of instructions further comprising:

determining a shared subspace for common transmissions to the first client and the one or more clients;

determining a primary subspace containing the common transmissions; and determining private subspaces for the first client and the one or more clients for individual transmissions.

* * * * *